W. C. CUTLER.
ANTISKID DEVICE.
APPLICATION FILED JAN. 30, 1917.
1,352,403.
Patented Sept. 7, 1920.
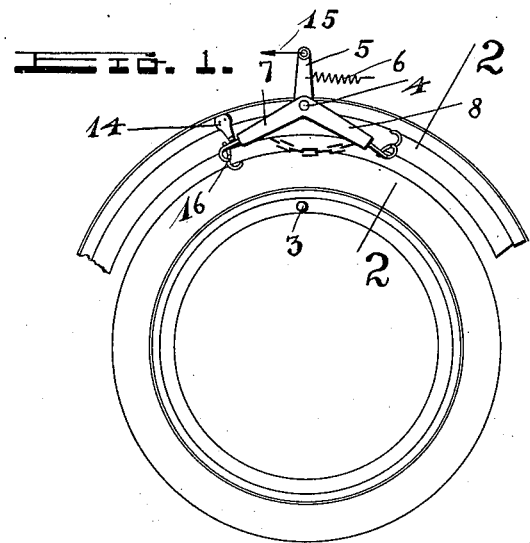
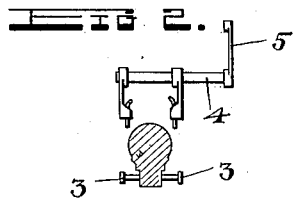
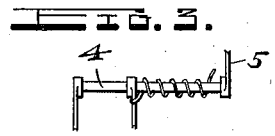
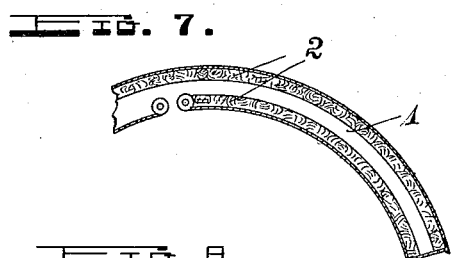
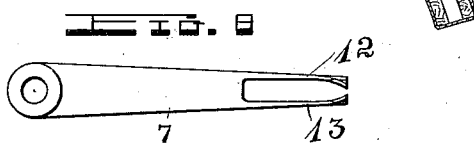
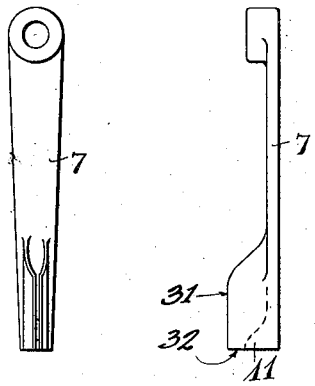
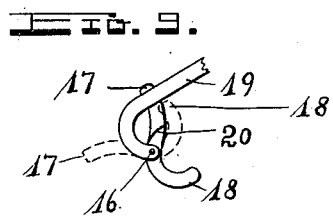
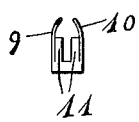
WITNESSES:
INVENTOR
William C. Cutler
BY
ATTORNEY

UNITED STATES PATENT OFFICE.

WILLIAM C. CUTLER, OF NORTH GLENDALE, CALIFORNIA.

ANTISKID DEVICE.

1,352,403.  Specification of Letters Patent. Patented Sept. 7, 1920.

Application filed January 30, 1917. Serial No. 145,521.

*To all whom it may concern:*

Be it known that I, WILLIAM C. CUTLER, a citizen of the United States, residing at North Glendale, in the county of Los Angeles and State of California, have invented a new and useful Antiskid Device, of which the following is a specification.

My invention relates to anti-skid devices; and the objects of my device are, to stop skidding when passing at high speed over unforeseen slippery ground; to provide an anti-skid device which can be operated from the driver's seat of a vehicle; to provide an anti-skid device which will attach itself to a wheel while rotating; to provide disengaging means which will allow an automatic placing of an anti-skid device to the wheel of a vehicle when rotating; to provide an anti-skid device which can be put on wheels of vehicles while the vehicles are in motion by mechanism operated from the driver's seat; the invention consisting in the construction, combination and arrangement of devices hereafter more fully described and claimed, and illustrated in the accompanying drawing, in which—

Figure 1 is a side view of an automobile wheel with the fender showing the relation of my device to the wheel.

Fig. 2 is a cross section of the wheel in Fig. 1 on line 2—2 showing the operating levers in end view.

Fig. 3 is a detail fragmentary end elevation of the operating levers in Figs. 1 and 2, in slightly modified form, having a coil spring around the shaft 4 instead of the spring 6 attached to the lever 5 in Fig. 1.

Fig. 4 is an end view of one chain engaging lever in enlarged scale.

Fig. 5 is a side view of the lever in Fig. 4.

Fig. 6 is a view of the chain engaging end of the lever in Figs. 4 and 5.

Fig. 7 is a section through the fender of an automobile with provisions for holding the chain and for preventing the chain from rushing out too quick.

Fig. 8 is a view similar to Fig. 4, illustrating a slight modification of the chain engaging end of the lever.

Fig. 9 is a fragmentary side elevation of the locking end of the wheel chain.

Similar numbers refer to similar parts throughout the several views.

A chamber 1 is formed adjacent to the fender of an automobile, see Fig. 7, padded by matting, or other suitable soft material, preventing a non-skid chain from rushing out too quick when placed in the chamber and operated on as described hereafter.

The automobile wheel is provided with sidewise projecting pins 3, which, of course, can be constructed so as not to extend too far off the wheel and in the drawing in Fig. 2 are only drawn out of proportion so as to be clearly seen. An operating shaft 4 is mounted crosswise on the fender, or in close relation to the automobile wheel. An operating lever 5 is secured to the shaft having a spring 6 attached thereto for holding the lever and thereby the shaft normally in neutral position. Chain engaging levers 7 and 8 are also secured to the shaft 4. The chain engaging ends are made clamp-like and so formed that the chains will not disengage by the vibration of the automobile but only by a forward jerk on the chain. The lips 9 and 10 are spring-like, allowing a chain, placed between the two lips to slip out of engagement when pulled upon. The projections 11 formed between the two lips, are provided as a rest for the chain. These projections 11 are curved toward the end edges 32 in the direction toward the front edges 31 respectively, of the lips to allow the chain to easily disengage from the levers, while offering enough resistance to hold the chain-ends between the lips when not pulled, that is, in the normal resting position of the chain-ends between the spring lips 9 and 10 on the lever ends.

A chain, placed between the spring lips 9 and 10 and being pulled, naturally presses against the incline of the projections 11, being directed by the projections toward the spring-like lips 9 and 10, naturally disengages easily from the lever, while the mere vibration of the automobile cannot disengage the chain from the lever, as will easily be understood.

A slight modification of the lever end is illustrated in Fig. 8, the end of the lever being simply split in two forming the two clamp-ends 12 and 13. The chain end placed between these clamp ends also disengages only by a forward jerk on the chain.

The ends of a non-skid automobile chain, placed in the chamber of my device, are clamped between the chain-engaging ends of the levers 7 and 8, one end of the chain normally to a pair of levers 7 on each side of the wheel, and the other end of the chain to a pair of levers 8 also one lever on each side of the wheel. The chain-end placed in the lever 7 rests against a stop 14, preventing the spring 6 from turning the operating mechanism out of normal resting position.

Pulling on the operating lever 5 in the direction of the arrow 15 brings the chain engaging levers 7, see Fig. 1, with the chain end 16 in the path of the pin 3 on the revolving wheel.

The pin 3, when the wheel is revolving naturally hits the hook ends on the chain in such downwardly disposed position, and normally hits the turnable link between the pivot joint 16 and the end 17, see Fig. 9, since this turnable link, in its resting position, is always turned and disposed in the manner as illustrated in Figs. 1 and 9. Hitting the link, of course, means a turning of the link so as to bring the end 18 of the link close to the main body or part of the hook 19, while the shoulder 20 on the link comes to a position to engage over the curved part of the hook 19 so as to hold the link in this closed position. The hook and link, of course, are made of spring material to allow such turning, and springing as well as engaging of the shoulder 20 over the curved part of the hook, as will easily be understood.

After the hook ends of the chain have been pulled out of engagement from the lever 7, this lever, then being pulled and turned back to its resting position as illustrated in Fig. 1, by the spring 6, is naturally not long enough to engage with the stop 14, as will easily be understood from the illustration in Fig. 1, and, therefore, as soon as the first end of the chain is disengaged from the levers 7, the whole operating mechanism is turned over in the opposite direction to the arrow 15 thereby bringing the levers 8 with the other ends of the chain in the path of the pin 3, and normally the pin engages after the first full turn of the wheel with the other end of the chain thereby firmly engaging the whole chain over and to the wheel automatically.

Having thus described my invention, I claim:—

1. In an anti-skid device of the class described, in combination with the body and wheel of a vehicle, a shaft disposed at a suitable place of the body near and crosswise to the wheel, a pair of chain engaging levers mounted on the shaft projecting in a forwardly direction one on each side of the wheel, and a second pair of chain engaging levers mounted on the shaft projecting in a rearwardly direction one on each side of the wheel.

2. In an anti-skid device of the class described, in combination with the body and wheel of a vehicle, a receptacle, engaging means provided on the wheel, a shaft disposed at a suitable place of the body near and crosswise to the wheel, engaging levers mounted on the shaft projecting in a forwardly direction having chain engaging means, other engaging levers mounted on the shaft projecting in a rearwardly direction having chain engaging means, a chain removably disposed in the receptacle one end removably engaging with the forwardly projecting levers and the other end removably engaging with the rearwardly projecting levers, means for retarding the chain in the receptacle when the chain is discharged from the receptacle to properly engage over the wheel, a stop provided at a stationary point in relation to the body in a position to engage with the chain-end in the forwardly projecting levers when the levers are in resting position beyond reach of the forwardly projecting levers, means disposed in relation to the levers for holding the levers in resting inoperative position when the chain is engaged with the levers adapted to hold the levers in operative position when the first end of the chain has been removed from the forwardly projecting levers, and operating means for moving said forwardly projecting levers so as to bring the chain-end in that lever in a position to engage with the engaging means on the wheel.

3. In an anti-skid device of the class described, in combination with the fender of a vehicle and the wheel of such vehicle, a receptacle disposed at the underside of the fender along the curves of the wheel, a chain removably disposed in the receptacle, engaging means on the wheel, double levers disposed near the receptacle and near the wheel removably engaged with both ends of the chain, and operating means for engaging the chain with the engaging means on the wheel.

4. In an anti-skid device of the class described, in combination with a stationary part of a vehicle and the wheel of the same vehicle, a receptacle, an independent anti-skid element removably disposed in the receptacle with both ends of the anti-skid element projecting out of the receptacle, engaging means on the wheel, and double engaging levers removably engaging both ends of the anti-skid element for automatically disposing the second end of the anti-skid element for engagement with the engaging means on the wheel after the first end of the anti-skid element has been engaged operatively to the engaging means on the wheel.

5. In an anti-skid device of the class described, in combination with a stationary part of a vehicle and the wheel of the same vehicle, a receptacle, an independent anti-skid element removably disposed in the receptacle with both ends of the anti-skid element projecting out of the receptacle, engaging means on the wheel, double engaging levers removably engaging with both ends of the anti-skid element so as to bring the ends of the anti-skid element beyond the ends of the levers, and a stop provided near the levers for holding the levers in inoperative position as long as the element ends are in engagement with the levers adapted for automatically releasing the levers into operative position for the second end of the anti-skid element after the first end has been disengaged from the levers.

6. In an anti-skid device of the class described, in combination with the stationary part of a vehicle and the wheel of the same vehicle, a receptacle secured to the stationary part of the vehicle having an opening in its side toward the wheel of the vehicle, an independent anti-skid element removably disposed in the receptacle with both ends projecting out of the opening in the side of the receptacle toward the wheel, engaging means on the wheel, means for retarding the anti-skid element in the receptacle when the anti-skid element is discharged from the receptacle to properly engage over the wheel, double engaging levers removably engaging with both ends of the anti-skid element so as to bring the ends of the anti-skid element beyond the ends of the levers, and a stop provided near the levers for holding the levers in inoperative position as long as the element ends are in engagement with the levers adapted for automatically releasing the levers into operative position for the second end of the anti-skid element after the first end has been disengaged from the levers.

7. In an anti-skid device of the class described, in combination with a stationary part of a vehicle and the wheel of the same vehicle, a receptacle provided on the stationary part of the vehicle, an anti-skid member disposed in the receptacle with both ends of the anti-skid member projecting out of the receptacle, pins provided at a suitable point at opposite sides on the wheel, means on the anti-skid member for engaging over the pins on the wheel, and means for operating the means on the anti-skid member to engage over the pins on the wheel.

8. In an anti-skid device of the class described, in combination with a stationary part of a vehicle and the wheel of the same vehicle having projecting members on opposite sides at the same point from the center of the wheel and as disposed in the direction from the center, an anti-skid member disposed in the receptacle with both ends projecting out of the receptacle and having means to engage over the projecting members on the wheel when so operated.

9. In an anti-skid device of the class described, in combination with the stationary part of a vehicle and the wheel of the same vehicle having projecting members on opposite sides at the same point from the center of the wheel and as disposed in the direction from the center, an anti-skid member disposed in the receptacle with both ends projecting out of the receptacle and having means to engage over the projecting members on the wheel when so operated, and operating means normally engaging with both ends of the anti-skid member so as to bring one end of the anti-skid member after the other into engagement with the projecting members on the wheel.

In testimony whereof I hereunto affix my signature in the presence of two witnesses.

WILLIAM C. CUTLER.

Witnesses:
OTTO H. KRUEGER,
C. MITSCHLER.